United States Patent

[11] 3,623,931

[72] Inventor Hollis L. Van Hosen
586 Mountain View, Apt. 1, Palm Springs, Calif. 92262
[21] Appl. No. 682,012
[22] Filed Nov. 13, 1967
[45] Patented Nov. 30, 1971

[54] METHOD OF MAKING PLASTIC CUSHION PRODUCT
12 Claims, 8 Drawing Figs.

[52] U.S. Cl. .................................................. 156/306, 156/242, 4/234, 264/45
[51] Int. Cl. .................................................. C09j 5/08
[50] Field of Search .......................................... 4/234, 236, 237; 156/242, 306; 264/31, 32, 33, 34, 45

[56] References Cited
UNITED STATES PATENTS

| 3,486,967 | 12/1969 | Fisher | 156/306 X |
| 3,264,382 | 8/1966 | Angell et al. | 264/46 |
| 3,379,800 | 4/1968 | Wert | 264/45 |
| 3,420,363 | 1/1969 | Blickensderfer | 206/46 |
| 1,784,619 | 12/1930 | Bishop | 4/236 |
| 2,957,793 | 10/1960 | Dickey | 154/100 |
| 2,966,686 | 1/1961 | Beneke, Jr. | 4/234 |
| 3,068,138 | 12/1962 | Friedman | 156/212 |
| 3,125,346 | 3/1964 | Poltorak | 277/1 |
| 3,133,853 | 5/1964 | Knox | 161/119 |
| 3,175,863 | 3/1965 | Hood | 297/455 |
| 3,193,441 | 7/1965 | Schafer | 161/159 |
| 3,216,068 | 11/1965 | Williams | 20/69 |
| 3,221,954 | 12/1965 | Lux | 222/566 |
| 3,258,511 | 6/1966 | McGregor, Jr. | 264/45 |

FOREIGN PATENTS

| 946,152 | 1/1964 | Great Britain | 4/237 |

Primary Examiner—Reuben Epstein
Attorney—Fulwider, Patton, Rieber, Lee & Utecht

ABSTRACT: A plastic cushion product comprising a flexible polyvinyl chloride skin and a closed-cell polyurethane core which is preferably directly bonded to the polyvinyl chloride skin.

A preferred method of making the plastic cushion products comprising: molding and curing the vinyl chloride at temperatures above about 255° F. for a time sufficient to produce an open polyvinyl chloride shell of desired thickness and just sufficient to cure the polyvinyl chloride to its gild or gel stage; molding polyurethane foam at a temperature of at least 350° F. into a shape substantially conforming to the polyvinyl chloride shell; curing a second amount of vinyl chloride at the temperature and time conditions previously described to form a polyvinyl chloride cover such that the polyvinyl chloride shell and cover mate to form a completely enclosed structure; heating the completely enclosed polyvinyl chloride structure containing the polyurethane foam to a temperature of at least 350° F. to completely cure the polyvinyl chloride. The final cure bonds the polyvinyl chloride shell and cover into a substantially continuous skin and bonds the polyvinyl chloride shell and cover to the polyurethane foam to form an essentially unitary cushion product.

PATENTED NOV 30 1971

INVENTOR.
HOLLIS L. VAN HOSEN

BY Fulwider, Patton, Rieber
Lee, and Utecht
ATTORNEYS

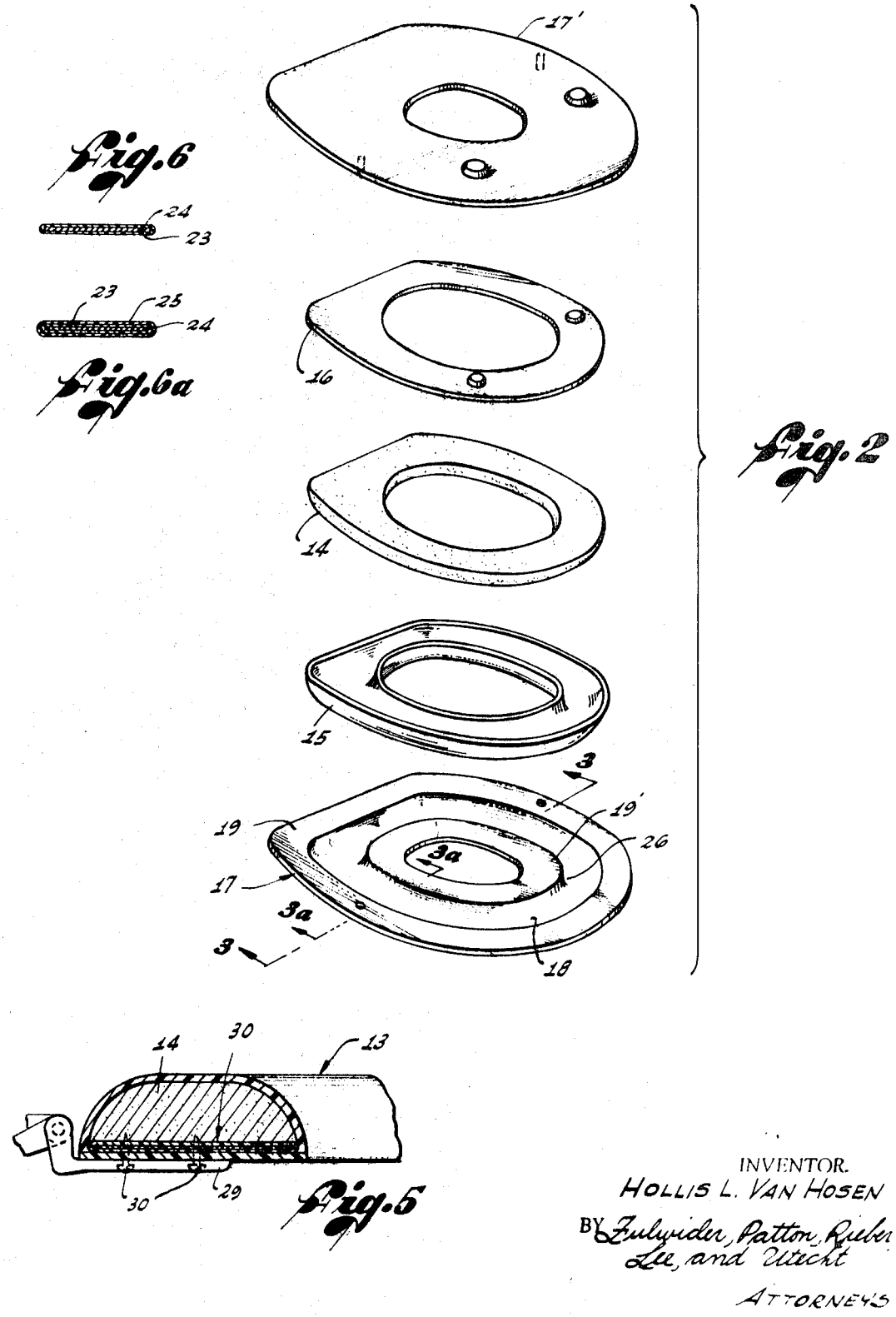

METHOD OF MAKING PLASTIC CUSHION PRODUCT

BACKGROUND OF THE INVENTION

This invention relates generally to plastic cushions and the like and, more specifically, to polyvinyl chloride-polyurethane foam cushion-type articles.

Various applications exist in which it is desirable to have a "cushioned" seat to make sitting more comfortable or where it is desirable to have "cushioned" walls to prevent injury to a person falling against such walls. Examples of such applications are stool seats, chair seats, toilet seats, benches and bathtub liners.

Heretofore, the requirement for a cushioned member in some of these applications, for example, stool seats and toilet seats, has been met by placing a padding material such as cotton or various foam materials on a hard base such as wood and stretching a thin skin material such as leather over the padding and attaching the skin to the hard base. While this solution has provided a comfortable seat for a time these cushions have a number of disadvantages, for example, cracking and tearing of the skin and shifting of the padding. Additionally, such cushion members are generally not capable of resisting attack by water and other fluids which are spilled on them. The result is that the cushion members discolor and/or lose their cushioning ability. Many of the prior art cushion members have the further disadvantage in that they are usually weakened and cracked by sunlight.

SUMMARY OF THE INVENTION

The plastic cushion products of this invention comprise a flexible polyvinyl chloride skin enclosing and preferably directly bonded to a closed-cell polyurethane core. This combination is highly resilient and substantially returns to its original shape and dimensions even after repeated severe deformation.

Cracking of the cushion surface is substantially eliminated because the polyvinyl chloride skin is extremely resistant to wear and to sunlight (particularly if an ultraviolet stabilizer is included in the polyvinyl chloride). Tearing of the cushion products is retarded because of the inherent ability of polyvinyl chloride to resist tearing and because the polyurethane core is bonded to the polyvinyl chloride skin thereby, in effect, reinforcing the skin resistance to tearing. Because of the essentially unitary structure of the cushion products which results from the interbonding of the polyvinyl chloride skin and polyurethane core, the foam material does not shift away from points on the cushion to which pressure is applied. Therefore, substantially uniform support is provided throughout the cushion products whether tightly or heavily loaded.

The cushion products of this invention have a further advantage in that their color can be widely varied by the addition of coloring agents to the vinyl chloride from which the polyvinyl chloride skin is made or by addition of colored matter, for example, spangles to the outer cells of the foam core.

Still another advantage to be derived from the cushion products of this invention is the ability of these products to firmly hold in place anchor plates to which hardware, for example, hinges, can be attached to, in turn, connect the cushions to other components to produce a complete unit, for example, a toilet seat and cover therefor. Such anchor plates can be positioned in the cushion products without noticeable loss of resilience.

DESCRIPTION OF THE DRAWING

FIG. 2 is an exploded perspective view of a mold and cover showing therebetween the top and backplate sections of a polyvinyl chloride skin and a polyurethane foam core to be enclosed by the polyvinyl chloride skin.

FIG. 5 is a partial sectional view of a toilet seat of this invention taken along the line 5—5 of FIG. 1 and showing an anchor plate inserted therein.

FIGS. 6 and 6a are sectional views of an anchor plate such as that shown in FIG. 5 and illustrate successive stages in its formation.

DESCRIPTION OF THE PREFERRED EMBODIMENT

Figure 1:
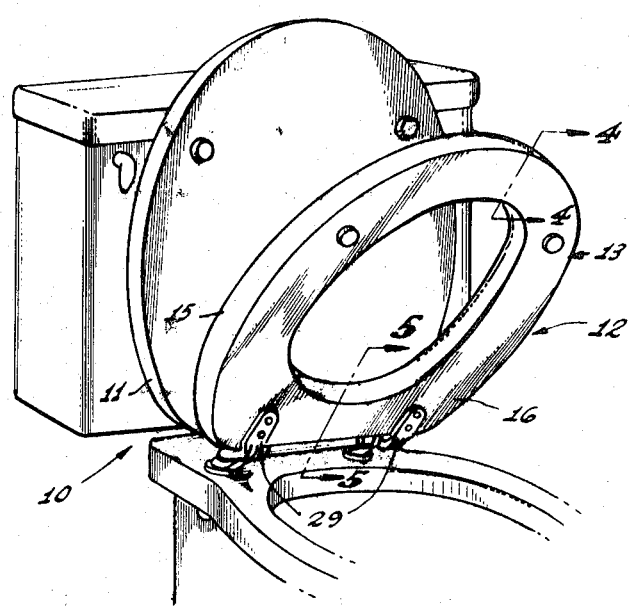
FIG. 1 is a perspective view of a cushioned toilet seat and cover of this invention in raised position on a toilet.

Although the plastic products of this invention may take various forms, for example, bar stool covers, hand rails, bathtub liners, cushions for furniture such as couches, and toilet seats, they are all characterized by their compressibility and resilience. Therefore, they will hereinafter, and in the claims, be referred to generically as "plastic cushion products."

The plastic cushion products of the present invention comprise, in general, a polyvinyl chloride outer skin and an inner polyurethane foam core. In the preferred structure, the contacting surfaces of the polyvinyl chloride skin and the polyurethane core are bonded together by a mechanical bond. Thickness of the polyvinyl chloride skin and the amount of polyurethane foam may be varied depending upon the use for which the products made by this invention are intended. Metallic components may be inserted into the plastic cushions to provide anchor points so that such cushions can be attached, for example, by hinges, to other components to make a complete unit.

The plastic cushion products of the present invention are tough, durable, resilient and have substantially 100 percent memory, that is, they return substantially to their initial shape even when severely bent or distorted. These plastic cushion products may also be produced in a wide variety of sizes and shapes. These desirable characteristics are believed due, not only to the unique combination of polyvinyl chloride and polyurethane foam, but also to the novel, integral construction of the plastic cushion products.

More specifically, the outer skin of the plastic cushion products is made from "flexible" polyvinyl chloride. The flexibility of the "flexible" polyvinyl chloride may be altered, within limits by employing various well-known plasticizers, for example, phthalates and adipates, in combination wit vinyl chloride to produce the desired polyvinyl chloride. Flexibility of the polyvinyl chloride is indicated by its hardness. Those portions of the plastic cushion products on which a person sits or stands have a Shore A hardness between about 70 and about 85. Below this range, the flexibility is too high, thereby permitting excessive movement of the core material which greatly reduces cushioning. Above this range, the polyvinyl chloride is too hard to provide adequate cushioning. Preferably, the Shore A hardness of the polyvinyl chloride is between about 75 and about 78. Within this range, compressibility and firmness are optimally balanced. For those portions of the plastic cushion products which are in contact with a supporting structure, the polyvinyl chloride flexibility can be much less and generally, the Shore A hardness of such sections is about 100.

The thickness of the polyvinyl chloride is variable. However, the polyvinyl chloride thickness is substantially thicker than that (about 0.062 in.) presently generally used for coverings for cushions and the like. The polyvinyl chloride thickness is between about 0.100 in. and about 0.250 in. and is preferably about 0.125 in. The thicker polyvinyl chloride skin used in this invention increases the rate of recovery of the cushion product after it has been deformed.

The skin of the plastic cushion products may be made from one or more polyvinyl chloride sections. Regardless of the number of polyvinyl chloride sections from which a plastic cushion product is fabricated, the skin is essentially continuous and unitary. This unitary construction is accomplished by partially curing vinyl chloride to form the polyvinyl chloride sections and, thereafter, completely curing the polyvinyl chloride sections with their edges in abutting contact. When completely cured, the polyvinyl chloride skin is self-supporting, that is, it does not collapse if the core material is removed.

Polyvinyl chloride is the preferred skin material because, in addition to its excellent recovery after being deformed, weatherability, wearability, flexibility and fluid impermeability, it is easy to work with. This is because no mold release is required to free the polyvinyl chloride skin from the mold and, consequently, fewer parts are rejected and, because it is cured under heat, better control of the skin thickness is possible merely by controlling the gild or gel (partial cure) temperature. Other plastics, such as polyurethane sheet material, may be used in place of the polyvinyl chloride although such materials present curing and forming problems.

The core material is a closed-cell polyurethane foam. Preferably, the polyurethane foam has a density between about 1.75 and about 2 pounds per cubic foot. Above this range, the polyurethane foam tends to be too hard to serve as a cushioning material whereas, below this range, the polyurethane foam tends to "flow" away from the point of applied pressure. This range may be varied to some extent, about 20 percent, by varying the thickness and hardness of the polyvinyl chloride skin.

The polyurethane foam core has dimensions substantially the same as the interior dimensions of the polyvinyl chloride skin prior to its being inserted into the skin. If the polyurethane foam core is smaller than the interior of the polyvinyl chloride skin, the amount of cushioning possible with a cushion of a particular size will be less than maximum since a vacuum will exist between the skin and core. Additionally, recovery of the polyvinyl chloride skin after being deformed may not be complete since a smaller polyurethane core cannot aid in expanding the skin to its initial dimensions. If the polyurethane core is substantially larger than the interior dimensions of the polyvinyl chloride skin before being inserted into the skin, the polyurethane will be substantially compressed even when no pressure is applied to the cushion with the result that substantially less cushioning action is possible in such a structure.

In the preferred structure, the polyvinyl chloride skin and the polyurethane foam core are bonded directly to each other. This bond is produced by completing the cure of the polyvinyl chloride when in contact with the polyurethane foam. The outer cells of the polyurethane foam act as a sponge when in contact with the partially cured polyvinyl chloride so that some of the partially cured polyvinyl chloride enters the polyurethane foam to form a primarily mechanical bond between the polyvinyl chloride and polyurethane foam. The presence of a polyvinyl chloride-polyurethane foam bond has certain advantages. First, such a bond, by making the plastic cushion products substantially integral units, substantially increases the rate of recovery of the plastic cushion products after they have been deformed. Secondly, if the polyvinyl chloride skin is punctured, the existence of a bond between the polyvinyl chloride and the polyurethane foam prevents moisture form flowing laterally away from the opening between the polyvinyl chloride skin and polyurethane core. Additionally, because the outermost cells of the polyurethane foam core absorb some polyvinyl chloride moisture is prevented from flowing through the core. This produces a very sanitary structure which is particularly useful for toilet seats.

The plastic cushion products of this invention will be further described with reference to the methods for making such products. For convenience in describing these methods and to illustrate various modifications and additions to the products of this invention, reference will hereafter be made to the production of a resilient toilet seat.

In general, the preferred method for producing a cushioned toilet seat comprises: molding and curing vinyl chloride into a polyvinyl chloride shell having a desired configuration at time and temperature conditions so that the polyvinyl chloride is not substantially completely cured; molding polyurethane foam so that it substantially conforms to the configuration of the aforementioned polyvinyl chloride shell; placing the molded polyurethane foam into the molded polyvinyl chloride shell, and, thereafter, completely enclosing the polyurethane foam by placing a second, partially cured, polyvinyl chloride sheet, conforming to the edge contour of the molded polyvinyl chloride shell, in edge contact with the latter and heating the polyvinyl chloride to a temperature of at least about 350° F. to bond the polyvinyl chloride sections together and to bond the polyvinyl chloride sections to the polyurethane foam.

Various plasticizers may be added to one or both of the polyvinyl chloride sections prior to initial curing to tailor the strength and resilience of each polyvinyl chloride section. Additionally, various coloring agents, for example, metal flakes can be added to the polyurethane foam to provide a variety of color effects.

More specifically, with reference to the Figures and firstly to FIG. 1, the numeral 10 designates a toilet seat comprising a cover or lid member 11 and a seat member 12. The cover member 11 may comprise a polyvinyl chloride skin and a polyurethane foam core or it may be a solid plastic lid made from, for example, polystyrene. The cover member 11, when made from polyvinyl chloride and polyurethane foam is made in substantially the same way as the seat member 12, which is described hereafter, and, therefore, will not be described separately.

Figure 4:
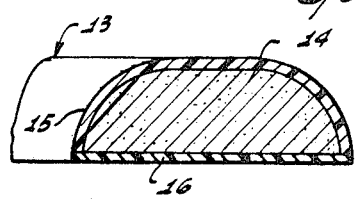
FIG. 4 is a partial sectional view of a toilet seat of this invention taken along the line 4—4 in FIG. 1.

The seat member 12 comprises a polyvinyl chloride skin 13 enclosing a polyurethane foam core 14 (FIGS. 2 and 4). The polyvinyl chloride skin 13 is comprised of a top or shell section 15 and a backplate section 16.

In the preferred method of making the seat member 12, a mold 17 such as that shown in FIG. 2 is employed. The mold 17 has a cavity 18 defined by a concave surface 26 and having the same shape as the desired toilet seat member 12. Surfaces 19, 19' of the mold adjacent and extending laterally from opposing edges 27, 27' of the cavity 18 are substantially coplanar.

The mold 17 is preheated to a temperature of about 350° F. The temperature of the mold 17 is not critical. However, it must be high enough to raise the temperature of the vinyl chloride to at least about 255° F. and preferably below about 285° F. Above this temperature range, the polyvinyl chloride is affected in such a way that, when thereafter completely cured, the polyvinyl chloride discolors. Below this temperature range, it is difficult to obtain parts of desired thickness since the heat transfer through the newly formed polyvinyl chloride at such lower temperatures is relatively slow and uneven. Additionally, at curing temperatures below this range, the partially cured polyvinyl chloride is quite sticky and flowable and, in such condition, is absorbed by the polyurethane foam to such an extend that the polyvinyl chloride skin 13 is severely weakened and deformed.

Figure 3:
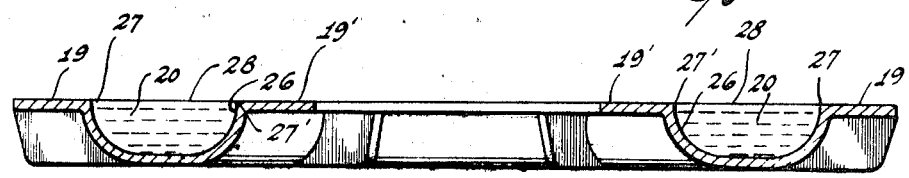
FIG. 3 is a sectional view of the mold of FIG. 2 taken along the line 3—3 and shows the mold filled with vinyl chloride.
Figure 3A:
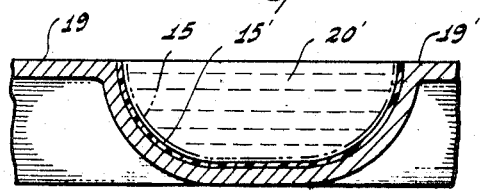
FIG. 3a is a partial sectional view of the mold of FIG. 2 taken along the line 3a—3a and shows "growth" of a polyvinyl chloride skin outwardly from the mold walls.

Liquid vinyl chloride is poured into the cavity 18 in the heated mold 17 until the surface 28 of the vinyl chloride is approximately level with the die surfaces 19, 19' to form a liquid vinyl chloride pool 20 as shown in FIG. 3. The vinyl chloride immediately begins to cure (polymerize) from the hot cavity surfaces 26 inwards towards the center of the liquid vinyl chloride pool 20 as shown in FIG. 3a by the numerals 15, 15'.

The vinyl chloride is allowed to cure only long enough to partially cure the vinyl chloride. Such partial curing is not sufficient to permit handling of the part upon cooling. The degree of cure at this stage. is equal to about 60 percent to 70 percent of the cure of completely cured polyvinyl chloride. This partially cured state is designated herein and in the claims by the terms "gel stage" and "gild stage." Using a mold temperature of about 350° F., about 30 seconds are required to obtain a polyvinyl chloride shell 15 about ⅛ in. thick. When the shell 15 having a desired thickness is obtained, the remaining uncured liquid vinyl chloride 20' (FIG. 3a) is drained off.

The backplate 16 is made in substantially the same way as the top section 15 except that a different mold (not shown) is used to provide the backplate with a desired shape and thickness. As with the top section 15, the polyvinyl chloride employed to form the backplate is cured only to the gild stage.

To produce the polyurethane foam core 14, a piece of polyurethane foam is cut to approximately the desired shape. This partially shaped piece of polyurethane foam is inserted into a preheated mold similar to that shown in FIG. 2 (designated 17). A top is placed on the mold containing the polyurethane foam and heating of the foam continues until the desired shape is produced. The polyurethane foam is heated to at least about 350° F. Below this temperature the polyurethane foam cannot be formed. Substantially above this temperature, for example 400° F. for 5 minutes, the foam structure begins to break down thereby reducing both the density and strength of the foam.

With the die at about 350° F., the polyurethane foam is shaped in about 5 minutes. The polyurethane foam is able to withstand such a high temperature because forming of the polyurethane foam core 14 is carried out in the substantial absence of air (oxygen) due primarily to formation of a gaseous environment from the gases, for example, freon and carbon dioxide, which are used to form the foam and which are present in the foam.

Having formed the top and backplate polyvinyl chloride sections 15, 16, and the polyurethane foam core 14, these components are brought together in the mold 17, as shown, in exploded view in FIG. 2. The mold 17 is closed using a mold cover 17' and heated to bring the polyvinyl chloride up to at least 350° F. to complete the curing of the polyvinyl chloride sections 15, 16. This results in bonding the top and backplate sections 15, 16 together and in bonding the polyvinyl chloride sections 15, 16 to the polyurethane foam core 14. Heating is continued for a time sufficient to complete the cure. This may be as long as 21 minutes where hot air is circulated over the mold 17 and mold cover 17' or as short as 10 minutes where the mold and cover are immersed in a hot (400° F.) brine bath.

After completion of the final cure cycle, the mold 17 and cover 17' are cooled and the finished part is removed. Within about an additional 24 hours at ambient temperature, the part has acquired its full strength.

Where it is necessary to attach the plastic cushion products of this invention to other components, for example, a toilet seat member and cover member therefor, an anchor plate 24 (FIG. 5) may be incorporated into the part before the final cure. With reference to FIG. 6, this may be accomplished by bonding a layer of polyvinyl chloride 23 to a prepared metal plate 24. This is done by dipping the plate 24 into a vinyl chloride bath (not shown) and then curing the vinyl chloride adhering to the plate to its gel or gild stage to place a polyvinyl chloride layer 23 on the plate. The plate 24 with the polyvinyl chloride layer 23 thereon is coated a second time with vinyl chloride 25 (FIG. 6a) and the thus coated plate is depressed into the polyurethane core 14, for example, as shown in FIG. 5.

The various components of the toilet seat member 12, including the polyvinyl chloride-coated plate 24, are assembled in the mold 17, 17' as previously described and as shown in FIG. 2. Because of the presence of the polyurethane foam core 14 within the polyvinyl chloride skin 13, the metal plate 24 with polyvinyl chloride and vinyl chloride layers 23, 25 is pressed against both the polyurethane foam and the polyvinyl chloride skin and is thereby held firmly in place. This pressure exerted by the polyurethane core 14 serves to hold the anchor plate 30 in the desired position before curing and gives additional support to the anchor plate in the finished product. The assembly is heated to 350° F. to completely cure the polyvinyl chloride and vinyl chloride and, thereby, produce the desired end product. During this curing cycle, the polyvinyl chloride layer 23 bonds to the cured vinyl chloride layer 25 and the cured vinyl chloride layer 25 bonds to the surrounding polyurethane foam 14 and to the polyvinyl chloride skin 13. The anchor plate 24 is thus firmly fixed in the toilet seat member 12. Brackets 29 (FIGS. 1 and 5) may be attached to the anchor plate 24 by screws 30 for use in interconnecting the toilet seat member 12 and the cover member 11.

As thus described, the plastic cushion products of this invention comprise, in general, an outer polyvinyl chloride skin bonded to a polyurethane core. The plastic cushion products may also be made by forming polyvinyl chloride in the form of an enclosed shell conforming to the desired product shape without first inserting the polyurethane. This polyvinyl chloride skin is formed in substantially the same way (two step cure) and at substantially the same temperature conditions as previously described in connection with forming the polyvinyl chloride skin 13. However, it is necessary to use a rotating mold when bonding the "gelled" polyvinyl chloride sections together to form the skin because the polyvinyl chloride in its gelled state, and particularly the backplate section, cannot support itself without the assistance obtained from the polyurethane foam. Therefore, a rotating mold is used to force the polyvinyl chloride sections, in their gelled state, against the mold until fully cured. Polyurethane may be foamed in place within the polyvinyl chloride skin by conventional foaming techniques either when the polyvinyl chloride skin is still in the gelled state or after it is fully cured.

The latter described methods of producing the plastic cushion products of this invention are not preferred where it is necessary to insert anchor plates into one or more of the products. This is because special techniques have to be employed to position the anchor plate correctly because the anchor plate has to be positioned within the polyvinyl chloride skin before the polyurethane foam is injected. Therefore, in the latter methods, and as contrasted with the preferred method, there is no polyurethane foam to hold the anchor plate in position prior to bonding it in place.

This invention will be further described by the following example:

EXAMPLE

Molds to form the top and backplate members of a seat section of a toilet seat were preheated to 350° F. for 18 minutes. The molds were then wiped to remove any dust or small particles and a template was put in place on each mold to control the amount of vinyl chloride poured into the molds. Formation of the backplate member was facilitated by moving the mold on which the backplate member was formed back and forth to ensure the formation of a substantially smooth and uniform backplate member. Excess vinyl chloride was drained off the molds after thirty to forty seconds. At the end of this time, the top and backplate members were quite tacky. Therefore, they were set aside for a few minutes after which time the tackiness had substantially disappeared. When the seat and backplate members were no longer tacky, the templates were removed without tearing the polyvinyl chloride.

Polyurethane foam, preformed to conform to the shape of the top member of the seat, was inserted into the top member. Some liquid vinyl chloride was poured around the edges of the foam core to ensure a good bond between the foam and the polyvinyl chloride top member. Some liquid vinyl chloride was also poured on the foam at a point where an anchor plate was to be placed to provide a good bond between the anchor plate and the polyvinyl chloride skin and foam core. The anchor plate was then placed in position on the polyurethane foam core and the backplate mold was then placed on top of the top member mold to thereby bring the backplate and top members into edgewise contact. Pressure was applied to the two molds to bring them tightly together. In process of squeezing the molds together, excess polyvinyl chloride was squeezed out of the molds. The molds were clamped together and passed, on a conveyor, through an oven set at 550° F. for 18 minutes to complete the cure of the polyvinyl chloride and vinyl chloride.

After being subjected to the elevated temperature, the molds were removed from the oven and allowed to cure for about 15 to 30 minutes after which time the clamps were removed from the molds. The backplate and top member molds were separated from each other and the completed part was removed from the molds and laid on a flat surface to allow additional cooling and curing.

The resulting seat section was firm, yet resilient, and the polyvinyl chloride skin returned quickly to its initial position after being deformed.

It will be understood that various modifications can be made in the present invention without departing from the spirit of the invention. Therefore, this invention is to be limited only by the scope of the appended claims.

I claim:

1. A method for making a plastic cushion product comprising steps of:

heating vinyl chloride to its gel stage to form partially cured polyvinyl chloride sections, said gelled polyvinyl chloride sections capable of being formed into a continuous closed skin;

inserting a closed cell polyurethane foam core substantially conforming to the inner dimensions of said polyvinyl chloride sections;

further heating said gelled polyvinyl chloride sections associated to form said closed skin and containing therein said polyurethane foam, to a temperature of a least 350° F. to completely cure said gelled polyvinyl chloride sections and to bond said gelled polyvinyl chloride sections to each other and to said polyurethane foam, whereby a resilient cushion product is produced.

2. The method of claim 1 wherein said polyurethane foam core is preshaped to substantially conform to the inner dimensions of said skin by heating polyurethane foam in a mold at a temperature of 350° F.

3. The method of claim 1 wherein said polyurethane foam core is foamed in place in said polyvinyl chloride skin.

4. The method of claim 1 wherein said polyurethane foam core is foamed in place in said polyvinyl chloride skin after said further heating of said polyvinyl chloride skin.

5. The method of claim 1 wherein said vinyl chloride is heated to a temperature of at least about 255° F.

6. A method for making polyvinyl chloride-polyurethane foam cushion products comprising:

heating liquid vinyl chloride (at a temperature of at least 255° F.) in a mold for a time sufficient to produce gelled polyvinyl chloride sheets having a desired thickness, said gelled polyvinyl chloride sheets capable of being formed into a continuous closed skin;

heating closed-cell polyurethane foam at a temperature of at least 350° F. in the substantial absence of oxygen for a time sufficient to mold said polyurethane foam into a configuration having substantially the same dimensions as the interior of said skin;

heating said gelled polyvinyl chloride sheets, associated to form said closed skin and containing therein said polyurethane foam, to a temperature of at least 350° F. to completely cure said gelled polyvinyl chloride sheets and to bond said gelled polyvinyl chloride sheets to each other and to said polyurethane foam.

7. The method of claim 6 wherein said liquid vinyl chloride is heated to a temperature between about 255° F. and about 285° F.

8. The method of claim 6 wherein said gelled polyvinyl chloride sheets are between about 60 percent to about 70 percent cured.

9. The method of claim 6 wherein said polyurethane foam is heated to a temperature between about 350° F. and about 400° F.

10. The method of claim 6 wherein said polyurethane foam has a density between about 1.75 lb./cu.ft. and about 2.0 lb./cu.ft.

11. The method of claim 6 wherein said thickness of said gelled polyvinyl chloride is about 0.125 in.

12. The method of claim 6 wherein an anchor member is positioned within said cushion products, said member comprising the further steps of:

bonding a layer of gelled polyvinyl chloride to a metallic sheet to form said anchor member;

inserting said anchor member between said polyurethane foam and said gelled polyvinyl chloride of said skin prior to completely curing said polyvinyl chloride, whereby, after completely curing said polyvinyl chloride skin, said anchor member is bonded to said skin and to said polyurethane foam to be securely positioned in said cushion products.

* * * * *